US012191981B2

(12) United States Patent
Liu et al.

(10) Patent No.: US 12,191,981 B2
(45) Date of Patent: Jan. 7, 2025

(54) ALARM CORRELATION AND TICKETING FOR OPEN RECONFIGURABLE OPTICAL ADD/DROP MULTIPLEXER NETWORKS

(71) Applicant: AT&T Intellectual Property I, L.P., Atlanta, GA (US)

(72) Inventors: Qingyun Liu, Leander, TX (US); Balagangadhar Bathula, Dayton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 29 days.

(21) Appl. No.: 17/975,869

(22) Filed: Oct. 28, 2022

(65) Prior Publication Data

US 2024/0146436 A1    May 2, 2024

(51) Int. Cl.
*H04J 14/02*     (2006.01)
*H04Q 11/00*    (2006.01)

(52) U.S. Cl.
CPC ...... *H04J 14/0212* (2013.01); *H04Q 11/0005* (2013.01); *H04Q 2011/0009* (2013.01); *H04Q 2011/0016* (2013.01)

(58) Field of Classification Search
CPC .............................. H04B 10/07; H04J 14/021
See application file for complete search history.

(56) References Cited

U.S. PATENT DOCUMENTS

| | | | |
|---|---|---|---|
| 2004/0073663 A1* | 4/2004 | Scarth | H04L 41/22 709/224 |
| 2018/0270009 A1* | 9/2018 | Mansouri Rad | H04B 10/07953 |
| 2022/0078071 A1* | 3/2022 | Agapitos | H04L 41/16 |

* cited by examiner

*Primary Examiner* — Shi K Li
(74) *Attorney, Agent, or Firm* — Hartman & Citrin LLC

(57) ABSTRACT

The concepts and technologies disclosed herein are directed to alarm correlation and ticketing for reconfigurable optical add/drop multiplexer ("ROADM") networks. According to one aspect disclosed herein, a ROADM controller can create, based upon data associated with a plurality of ROADM network elements operating in a ROADM network, a graph of the plurality ROADM network elements. The ROADM controller can retrieve a plurality of alarms from at least a portion the plurality of ROADM network elements, associate the plurality of alarms with at least the portion of the plurality of ROADM network elements, and associate a direction of each alarm with a corresponding service direction. The ROADM controller can eliminate any alarms with a time stamp outside of a same time window. The ROADM controller can then determine that any remaining alarms are associated with a root cause of a failure within the ROADM network.

17 Claims, 10 Drawing Sheets

ALARM CORRELATION AND TICKETING FOR OPEN RECONFIGURABLE OPTICAL ADD/DROP MULTIPLEXER NETWORKS

BACKGROUND

The Open Reconfigurable Optical Add/Drop Multiplexers ("ROADM") multi-source agreement ("MSA") defines the YANG data models to represent ROADM and transponder network elements in a multi-vendor optical transport network. The Open ROADM MSA also defines interoperability specifications to eliminate vendor lock-in for both hardware and software control and management. An optical transport network composed of Open ROADM-compliant devices can be maintained and evolved by an open software-defined network ("SDN") controller. An Open ROADM-compliant SDN controller (e.g., Transport Path Computation Engine "TransportPCE") can provide functions such as device configuration, service provisioning, alarm/fault monitoring, and performance monitoring through southbound, non-proprietary application programming interfaces ("APIs"). The Open ROADM-compliant SDN control can provide other functions such as collaboration with higher layers of controller/orchestrator and external applications (e.g., user interface and network operational platform) through northbound non-proprietary APIs to increase network awareness and effectiveness.

An Open ROADM network requires a fault management and ticketing system to operate. Open ROADM devices are designed to detect faults and anomalies and to report failures to a fault management system via alarm notification. A single fault could cause multiple alarm notifications in the network because of fault propagation. In integrated transport systems, a ROADM device can perform alarm correlation and reporting suppression via a hierarchical relationship within the device and probable cause transformation via maintenance signaling (e.g., a payload missing indicator "PMI," a forward defect indication "FDI," and/or a backward defect indication "BDI") at the network level. In this integrated mode, the alarm behavior is consistent and predictable, which allows the alarm behavior to be precisely modeled with alarm pattern documents. In an Open ROADM network, the transponder function is disaggregated from the ROADM line, which disables the maintenance signaling between the transponder-to-ROADM. The optical transport network photonic layer maintenance signaling is disabled between ROADM devices to enable ROADM line system interoperability between different vendors. While the transponder device is still expected to conform to the maintenance signaling insertion and detection in the digital domain as specified in the relevant standards, if and how these maintenance signaling events are reported are not subject to standardization and vary among implementations. In addition, the extent of alarm correlation and suppression within a device by resource hierarchical relationship is implementation specific.

A fault management system has to tolerate subtle differences in implementation among different vendors. Although alarm correlation in a partially disaggregated multi-vendor optical network has been implemented, it has not been implemented in a fully disaggregated multi-vendor optical network.

SUMMARY

The concepts and technologies disclosed herein are directed to alarm correlation and ticketing for Open ROADM networks. According to one aspect disclosed herein, a ROADM controller can create, based upon data associated with a plurality of ROADM network elements operating in a ROADM network, a graph of the ROADM network elements. The ROADM controller can retrieve a plurality of alarms from at least a portion the plurality of ROADM network elements. The ROADM controller can associate the plurality of alarms with at least the portion of the plurality of ROADM network elements. The ROADM controller can associate a direction of each alarm with a corresponding service direction. The ROADM controller can eliminate any alarms with a time stamp outside of a same time window. The ROADM controller can then determine that any remaining alarms are associated with a root cause of a failure within the ROADM network.

The ROADM controller can monitor the plurality of ROADM network elements operating in the ROADM network. In some embodiments, the ROADM controller can monitor the plurality of ROADM network elements via an application programming interface. The ROADM controller can acquire the data from the plurality of ROADM network elements via the API.

The ROADM controller can create a hierarchical dimension of the graph. The hierarchical dimension of the graph can represent hierarchical relationships between containing entities and contained entities among the ROADM network elements. The ROADM controller also can create a horizontal dimension of the graph. The horizontal dimension of the graph can represent supporting relationships between a supported logical circuit, path, or link and an ordered list of supporting ports, interfaces, logical connections, and links.

The ROADM network elements can include a plurality of ROADMs and a plurality of xponders (i.e., transponders, muxponders, and/or switchponders). In some embodiments, the ROADM controller and the ROADM network elements are configured in accordance with Open ROADM MSA.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The concepts and technologies disclosed herein provide an implementation of an alarm correlation and ticketing system for a multi-vendor optical network. More particularly, a two-dimensional graph-based method can be used in an alarm correlation function to model devices and a network and subsequently generate a root cause alarm with recommended corrective actions.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
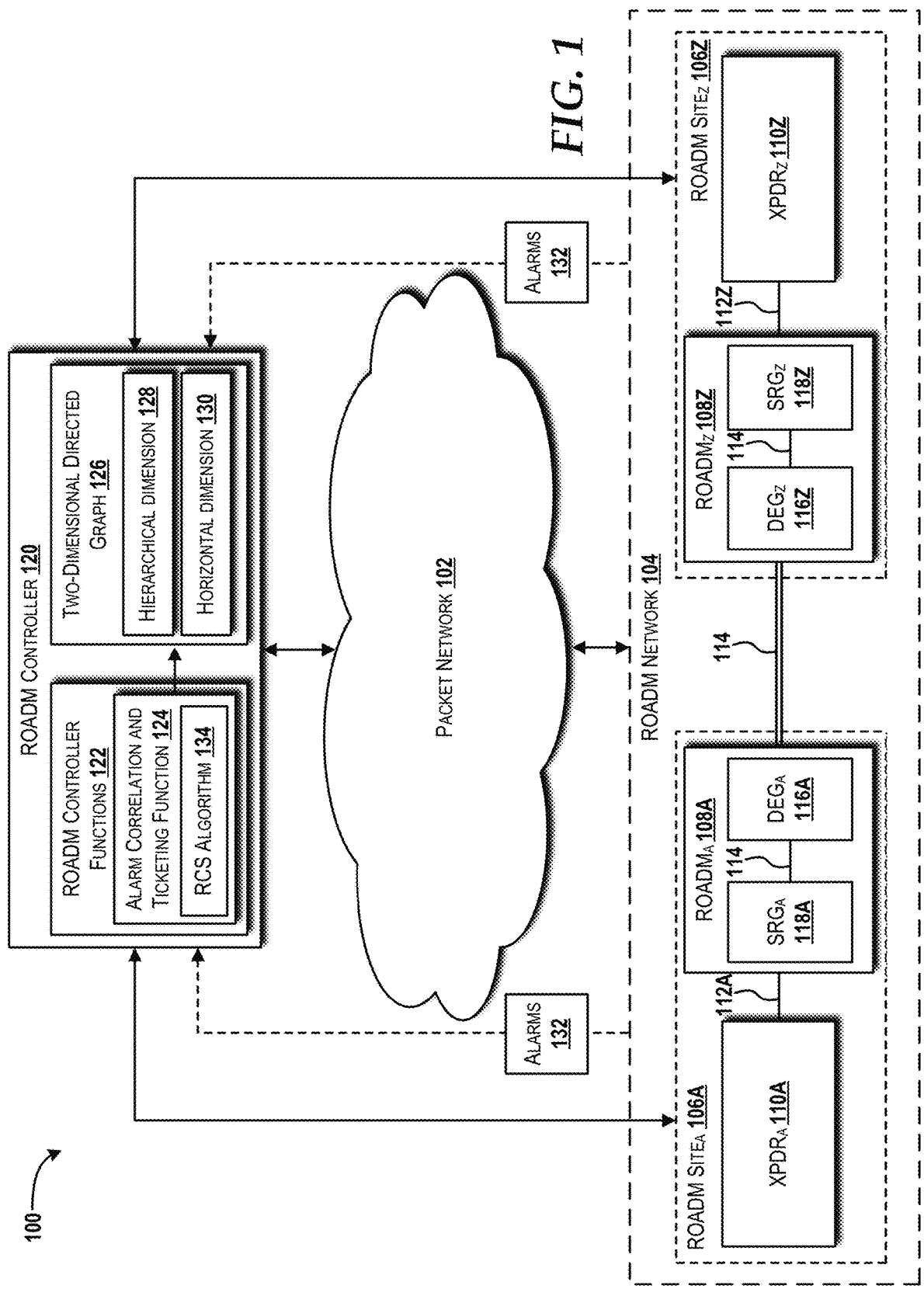
FIG. 1 is a block diagram illustrating aspects of an operating environment capable of implementing aspects of the embodiments disclosed herein.

Turning now to FIG. 1, a block diagram illustrating aspects of an operating environment 100 in which the concepts and technologies disclosed herein can be implemented will be described. The illustrated operating environment 100 includes a network layer provided by a packet network 102 (e.g., an IP and multi-protocol label switching "MPLS" network) operating over an optical layer provided by a ROADM network 104 (i.e., an optical transport network). The ROADM network 104 includes a plurality of ROADM sites 106A-106Z (referred to collectively as "ROADM sites 106" or individually as "ROADM site 106"). Each of the ROADM sites 106 includes a ROADM 108 (referred to collectively as "ROADMs 108" or individually as "ROADM 108") and an xponder 110 (shown as "XPDR 110") that can be either a transponder, a muxponder, or switchponder (referred to collectively as "XPDR 110" or individually as "XPDR 110"). In the illustrated example, ROADM site$_A$ 106A includes ROADM$_A$ 108A and XPDR$_A$ 110A operating in communication via a ROADM-transponder fiber link 112A, and site$_Z$ 106Z includes ROADM$_Z$ 108Z and XPDR$_Z$ 110Z operating in communication via a ROADM-transponder fiber link 112Z. The ROADMs 108 are operating in communication via a ROADM-ROADM fiber link 114. Although only two ROADM sites 106 are shown in the illustrated example, the ROADM network 104 may contain any number of ROADM sites 106. Moreover, although each ROADM site 106 includes a single ROADM 108 and a single XPDR 110, each ROADM site 106 can include one or more ROADMs 108 and/or one or more XPDRs 110.

The ROADMs 108 perform wavelength switching in the ROADM network 104. The ROADMs 108 provide interfaces to enable control of the ROADM network 104 to dynamically and remotely establish and release wavelength circuits, thus adjusting the logical topology and capacity of the packet network 102. Each wavelength connection either augments the capacity of a link or creates a new link in the packet network 102. The ROADMs 108 are described herein based upon the Open ROADM MSA. Those skilled in the art will appreciate that the ROADMs 108 instead may be configured based upon other current or future specifications, including open source and proprietary specifications. As such, the concepts and technologies disclosed herein are not limited to Open ROADM MSA-defined ROADM devices. The ROADMs 108 can provide colorless and directionless ("CD"), colorless, directionless, and contentionless ("CDC"), or other permutations of coloring, directing, and contention add/drop functionality. A colorless ROADM can allocate any wavelength or color to any port. A directionless ROADM can connect a wavelength in any direction with a local transponder (e.g., the XPDR 110). A contentionless ROADM eliminates the possibility that two identical wavelengths could collide in the ROADM 108.

The ROADM$_A$ 108A includes a direction/degree group (shown as "DEG$_A$") 116A and a shared risk group (shown as "SRG$_A$") 118A. Similarly, the ROADM$_Z$ 108Z includes a direction/degree group$_Z$ (shown as "DEG$_Z$") 116Z and a shared risk group$_Z$ (shown as "SRG$_Z$") 118Z. The direction/degree groups 116A, 116Z define the number of line interfaces supported. For example a 2-degree ROADM node provides two line interfaces. The shared risk groups 118A, 118Z define the number of add/drop banks.

The line sides of the XPDRs 110A, 110Z are connected to the SRGs 118A, 118Z, respectively. The client sides of the XPRDs 110A, 110Z are connected to other network equipment (e.g., a switch or router; not shown) operating in the packet network 102.

The operating environment 100 also includes a ROADM controller 120 (e.g., an SDN controller) that can maintain and evolve the ROADM network 104. In some embodiments, the ROADM controller 120 is an Open ROADM-compliant SDN controller (e.g., TransportPCE). The ROADM controller 120 can provide ROADM controller functions 122 such as device configuration, service provisioning, alarm/fault monitoring, and performance monitoring through southbound, non-proprietary application APIs. The ROADM controller 120 can provide other functions such as collaboration with higher layers of controller/orchestrator and external applications (e.g., user interface and network operational platform; not shown) through northbound non-proprietary APIs (also not shown) to increase network awareness and effectiveness. In accordance with the concepts and technologies disclosed herein, the ROADM controller functions 122 also include an alarm correlation and ticketing function 124 that can model devices (e.g., the ROADMs 108 and the XPDRs 110) and the ROADM network 104 and subsequently generate a root cause alarm with recommended corrective actions.

In the illustrated example, the alarm correlation and ticketing function 124 utilizes a graph-based service model to generate a two-dimensional directed graph 126 that includes a hierarchical dimension 128 and a horizontal dimension 130. The hierarchical dimension 128 models a containment relationship between a service and its underlying resources. The horizontal dimension 130 models a service/link trail. FIGS. 2A-2D provide example hierarchical or horizontal dimension diagrams.

Although aspects of the concepts and technologies disclosed herein focus on creating and using the two-dimensional directed graph 126 for fault management applications, including alarm processing and correlation, it should be understood that the concepts and technologies disclosed can be used in other applications. For example, a device resource may or may not report an alarm when a fault is detected because alarm reporting could be subject to other suppression logics or implementation limitations in the device resource. The operational state of the device resource, however, is expected to reflect the true operational or fault state of the device resource. In some embodiments, the two-dimensional graph data structure and functions could contain an operational state attribute value of the device resource in addition to or independent of the alarm state and can be used for fault management and root cause isolation applications.

Figure 2A:
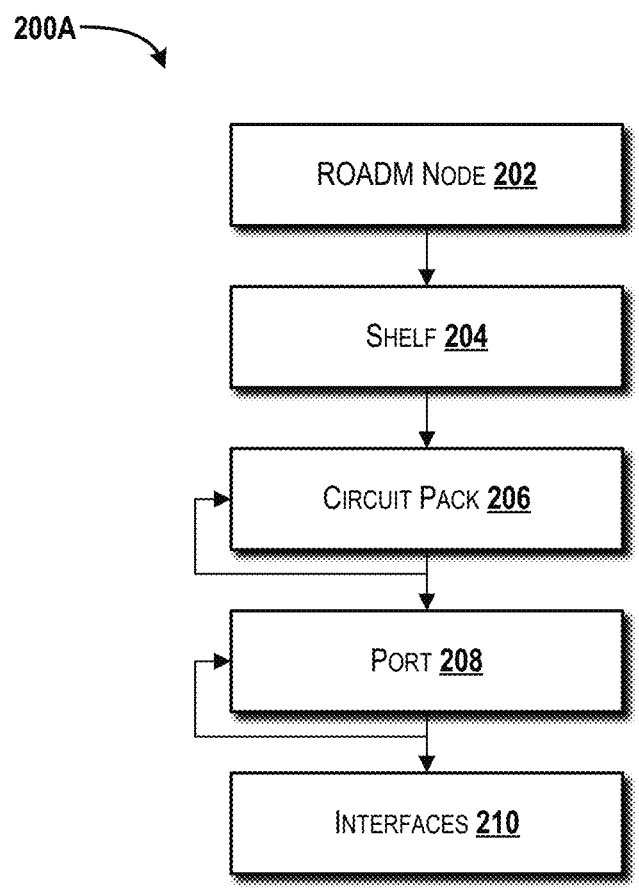
FIG. 2A is a hierarchical dimension diagram illustrating a general device level containment structure, according to an illustrative embodiment.

Turning now to FIG. 2A, a hierarchical dimension diagram 200A illustrating a general device level containment structure will be described, according to an illustrative embodiment. The Open ROADM device model is clearly defined in the Open ROADM MSA. The operational data associated with an Open ROADM device is retrieved by the ROADM controller 120. The hierarchical relationships between a containing entity and one or more contained entities in an Open ROADM device can be represented in a tree-like graph, such as shown in FIG. 2A.

The general device level containment structure shown in the hierarchical dimension diagram 200A includes a ROADM node 202 (e.g., a ROADM 108 or a XPDR 110) that contains one or more shelves 204, the shelf/shelves 204 each containing one or more circuit packs 206. The circuit pack(s) 206 each contain one or more ports 208. The port(s) 208 each contain one or more interfaces 210. The contained resource should not cause faults in the containing resource. For example, a fault in a port 208 should not cause a fault in the containing circuit pack 206. In other words, a fault always propagates from the containing resource to the contained resource, not the other way around.

Figure 2B:
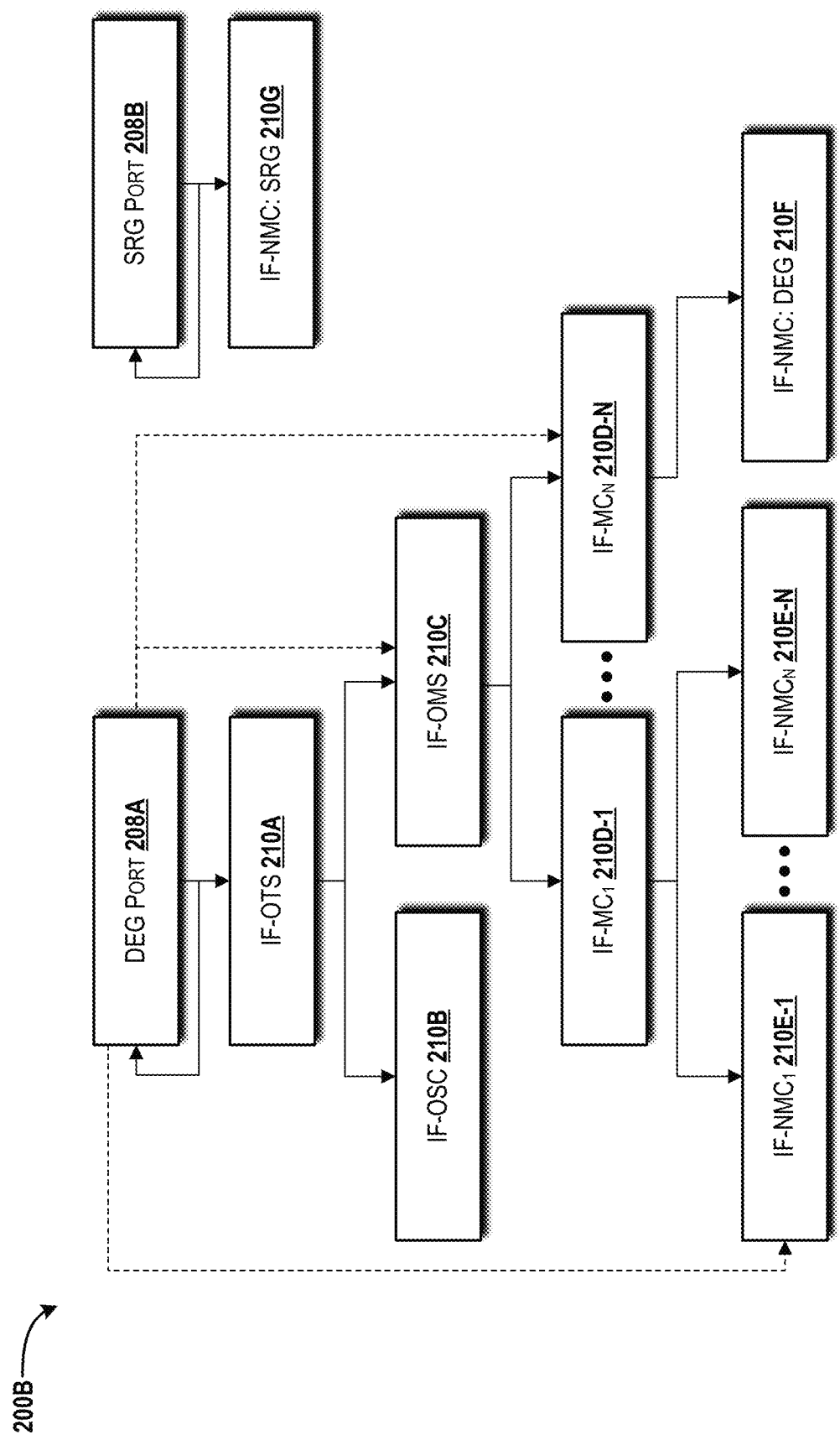
FIG. 2B is a hierarchical dimension diagram illustrating ROADM interfaces contained by degree ("DEG") and shared risk group ("SRG") ports, according to an illustrative embodiment.

Turning now to FIG. 2B, a hierarchical dimension diagram 200B illustrating ROADM interfaces contained by a DEG port 208A and an SRG port 208B will be described, according to an illustrative embodiment. The DEG port 208A of a ROADM 108 contains an optical transmission section ("OTS") interface (shown as "IF-OTS") 210A. The IF-OTS 210A contains an optical supervisory channel ("OSC") interface (shown as "IF-OSC") 210B and an optical multiplex section ("OMS") interface (shown as "IF-OMS") 210C. The IF-OMS 210C contains a first media channel ("MC") interface (shown as "IF-MC$_1$") 210D-1 through an N$^{th}$ MC interface (shown as "IF-MC$_N$") 210D-N. The IF-MC$_1$ 210D-1 contains a first network media control ("NMC") interface (shown as "IF-NMC$_1$") 210E-1 through an N$^{th}$ NMC interface (shown as "IF-NMC$_N$") 210E-N. The IF-MC$_N$ 210D-N contains a degree NMC interface (shown as "IF-NMC: DEG") 210F. The SRG port 208B contains an SRG NMC interface (shown as "IF-NMC: SRG") 210G.

Figure 2C:
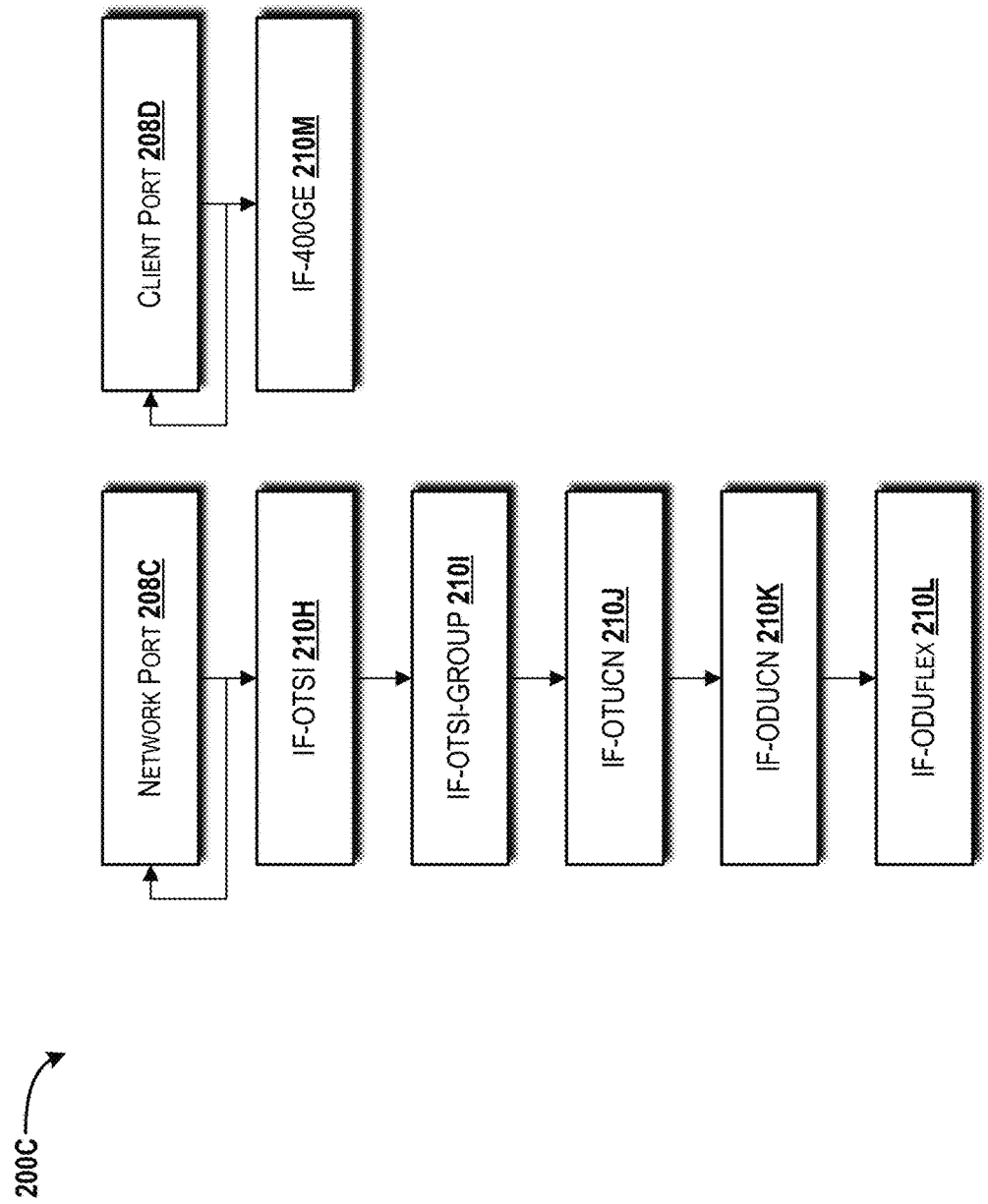
FIG. 2C is a hierarchical dimension diagram illustrating transponder interfaces contained by network and client ports, according to an illustrative embodiment.

Turning now to FIG. 2C, a hierarchical dimension diagram 200C illustrating xponder interfaces contained by a network port 208C and a client port 208D will be described, according to an illustrative embodiment. The network port 208C of an XPDR 110 contains an optical tributary signal ("OTSi") interface (shown as "IF-OTSi") 210I1. The IF-OTSi 210I1 contains an OTSi group interface (shown as "IF-OTSi-Group") 210I. The IF-OTSi-Group 210I contains an optical transport unit ("OTU") interface (shown as "IF-OTUCN") 210J. The IF-OTUCN 210J contains an optical data unit ("ODU") interface (shown as "IF-ODUCN") 210K. The IF-ODUCN 210K contains an ODUflex interface (shown as "IF-ODUflex") 210L. The client port 208D of the XPRD 110 contains a 400GE ethernet interface (shown as "IF-400GE") 210M.

Figure 2D:
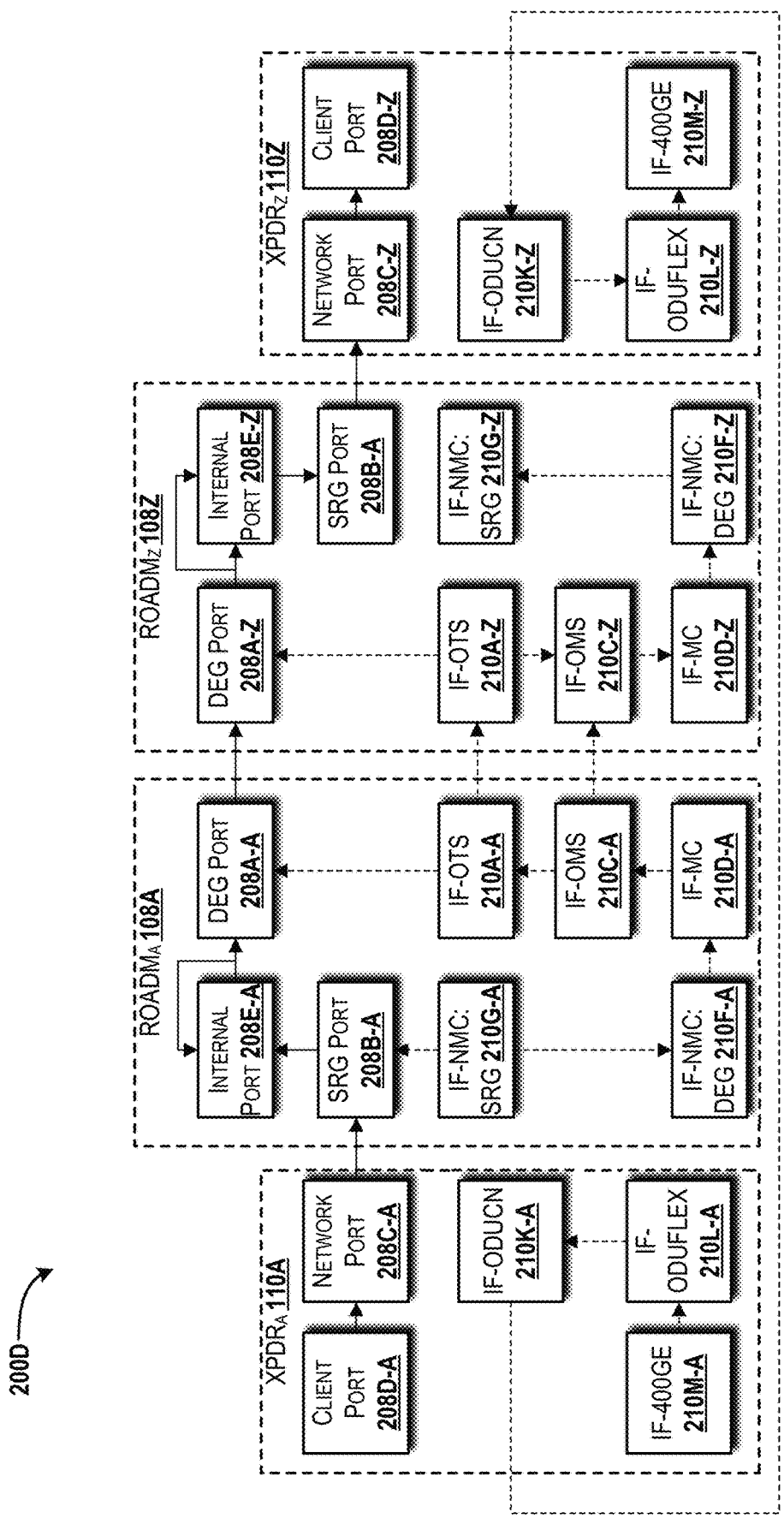
FIG. 2D is a horizontal dimension diagram illustrating a supporting relationship between a supported logical circuit/path/link ID and an ordered list of supporting ports, interfaces, and logical connections.

Turning now to FIG. 2D, a horizontal dimension diagram 200D illustrating a supporting relationship between a supported logical circuit/path/link and an ordered list of supporting ports 208, interfaces 210, logical connections, and internal/physical/external connections will be described, according to an illustrative embodiment. The horizontal dimension diagram 200D will be described with additional reference to FIGS. 1 and 2A-2C. The XPDR$_A$ 110A, the ROADM$_A$ 108A, the ROADM$_Z$ 108Z, and the XPDR$_Z$ 110Z from FIG. 1 are shown, each with various ports 208 and interfaces 210 from FIGS. 2A-2C. The XPDR$_A$ 110A includes a client port 208D-A, a network port 208C-A, and interfaces IF-ODUCN 210K-A, IF-400GE 210M-A, and IF-ODUflex 210L-A. The ROADM$_A$ 108A includes an internal port 208E-A, a DEG port 208A-A, an SRG port 208B-A, and interfaces IF-NMC: SRG 210G-A, IF-NMC:DEG 210F-A, IF-MC 210D-A, IF-OMS 210C-A, and IF-OTS 210A-A. The ROADM$_Z$ 108Z includes a DEG port 208A-Z, an internal port 208E-Z, an SRG port 208B-A, and interfaces IF-OTS 210A-Z, IF-OMS 210C-Z, IF-MC 210D-Z, IF NMC: DEG 210F-Z, and IF-NMC: SRG 210G-Z. The XPDR$_Z$ 110Z includes a network port 208C-Z, a client port 208D-Z, and interfaces IF-ODUCN 210K-Z, IF-ODUflex 210L-Z, and IF 400GE 210M-Z.

The directed connections shown are traced and created from a service routing list for all network element external interfaces (i.e., client, network, SRG, and DEG) and device internal connectivity retrieved by get-connection-port-trail remote procedure call ("RPC") defined in the Open ROADM MSA. In the illustrated example, a one-hop 400G service is modelled in the horizontal dimension. The solid connections represent the signal flow traveling through ordered supporting ports. The dashed connections represent the ordered list of supporting interfaces and logical connections at this signal layer. Due to different vendor implementations of alarm correlation and suppression with a given device (e.g., inconsistency in either reporting a loss of signal on an interface or loss of light on a port), additional connections from node west-ingress interface to its supporting port are modeled as complement; for example, the ROADM$_A$ 108A interface IF-NMC: SRG 210G-A to the SRG port 208B-A and the ROADM$_Z$ 108Z interface IF-OTS 210A-Z to DEG port 208A-Z. This ensures the logical fault propagation from network element to its immediate neighbor.

Returning to FIG. 1, with the two-dimensional directed graph 126 (hereinafter referred to as "graph" 126) built for each service in each direction, network alarm correlation logic provided by the alarm correlation and ticketing function 124 becomes a data structure search problem where the root cause is the most upstream resources that report a failure. Alarms 132 retrieved from network elements in the ROADM network 104 (e.g., the ROADMs 108 and/or the XPDRs 110) are attached to the nodes (i.e., resources) in the graph 126. The direction of each alarm is associated with the corresponding service direction. The hierarchical and horizontal correlation should be limited by a time window so that independent failures are not masked by the correlation.

An example root cause searching ("RCS") algorithm 134 executed by the alarm correlation and ticketing function 124 will now be described. Let G(V,E) be a graph 126 for a given direction of a service, where V is the set of nodes and E is the set of edges. V represents the set of nodes, shelves, circuit packs, ports, and interfaces. An edge e∈E in the graph G 126 represents the hierarchical and/or horizontal connection. $V_a$ represents the set of nodes with alarms. $A_i$ represents the set of alarms for node $i \in V_a$. $T_i$ represents the set of alarm time stamps for node $i \in V_a$. $t_{ij}$ represents the time-stamp off $j^{th}$ alarm at node i. $\Delta$ represents the time window for alarm correlation. $A' = U_{i=1}^n A_i$ is the set of all alarms in the graph 126. By eliminating the alarms 132 in the graph 126 that have an alarm with time stamps that are in the same time window, the remaining alarms 132 are the root cause(s). Pseudo-code for implementing the RCS algorithm 134 is shown below.

```
1: for n_i ∈ V_a do
2:   for n_j ∈ V_a do
3:     if n_i≠n_j & ∃path(n_i, n_j) & ∃(t_i,t_j) ∈ (T_i, T_j), | t_i-t_j | ≤ Δ then
4:       A' = A' - a_j, where a_j ⊆ A_j is a subset of alarms on node n_j
5:     end if
6:   end for
7: end for
8: return A'
```

All the remaining alarms A' for each graph 126 can be provided to a ticketing pool without duplicates. Port and interface alarms can be ticketed against the link or connection in the network. Alarms at the shelf, circuit pack level can be ticketed directly with relevant device node id, resource id, and the alarm fields. Corrective actions can be recommended based on experience.

Figure 3:
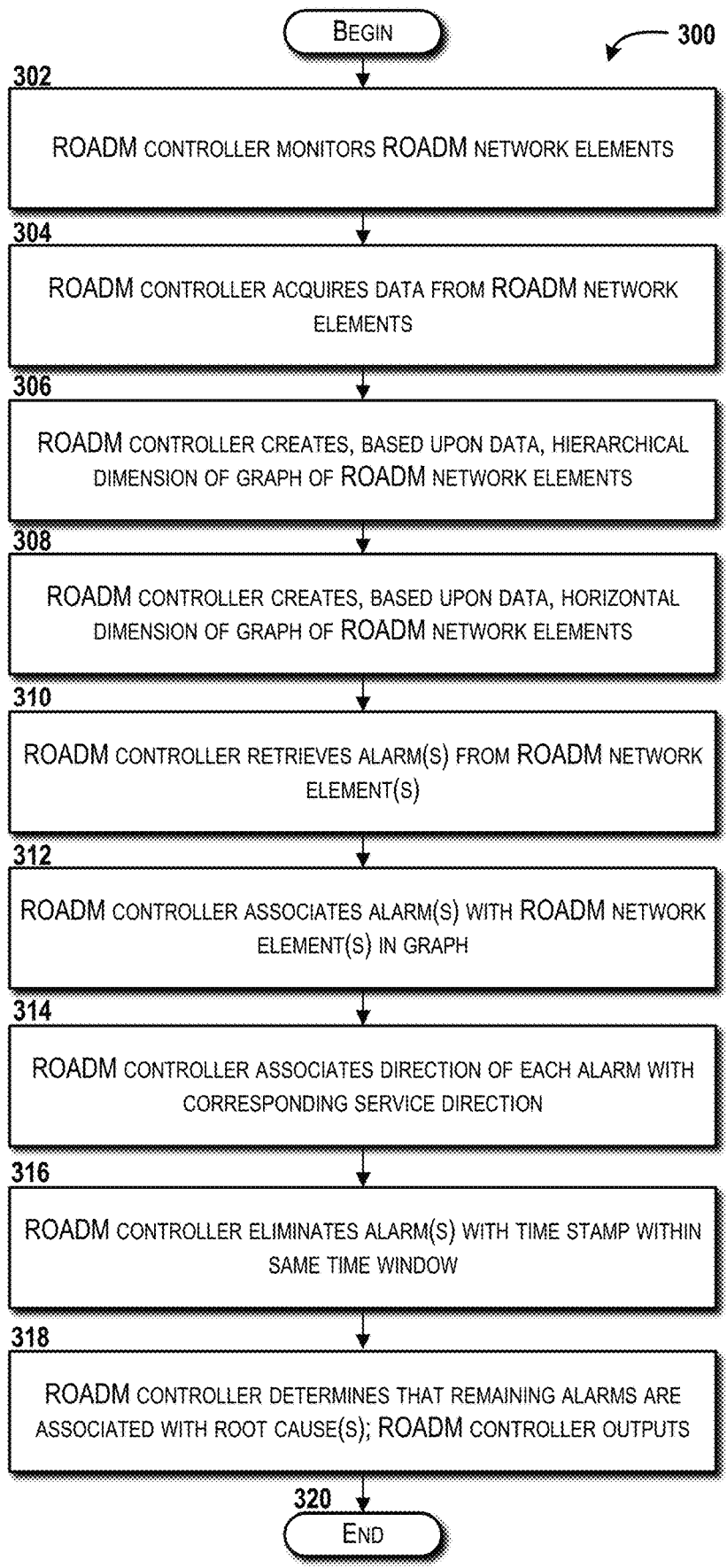
FIG. 3 is a flow diagram illustrating a method for correlating and ticketing alarms for Open ROADMS, according to an illustrative embodiment.

Turning now to FIG. 3, a method 300 for correlating and ticketing alarms for Open ROADMs, such as the ROADMs 108, will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of one or more cloud environments, computing systems, devices, engines, controllers, or components disclosed herein to perform operations. It should be understood that the performance of one or more operations may include operations executed by one or more virtual processors at the instructions of one or more of the aforementioned hardware processors.

The method 300 begins and proceeds to operation 302. At operation 302, the ROADM controller 120 monitors the ROADM network 104 elements, such as the ROADMs 108 and the XPDRs 110. From operation 302, the method 300 proceeds to operation 304. At operation 304, the ROADM controller 120 acquires data from the ROADM network 104 elements. As mentioned above, in some embodiments, the ROADM controller 120 is implemented as TransportPCE. TransportPCE aggregates operational data, performance monitoring, and alarms through NETCONF protocol/API, and keeps up-to-date by subscribing to the change and alarm notification streams (Open ROADM and NETCONF). Once connected to the network element, TransportPCE automatically creates and saves a port mapping for logical connection points to any physical ports related to transmission in a datastore. Network information with respect to various links between network elements and inside network elements is also stored in this datastore.

From operation 304, the method 300 proceeds to operation 306. At operation 306, the ROADM controller 120 creates, based upon the data, the hierarchical dimension 128 of the graph 126 of the ROADM network 104 elements. An example hierarchical dimension 128 of the graph 126 of the ROADM network 104 elements is illustrated and described above with reference to FIGS. 2A-2C. From operation 306, the method 300 proceeds to operation 308. At operation 308, the ROADM controller 120 creates, based upon the data, the horizontal dimension 130 of the graph 126 of the ROADM network 104 elements. An example horizontal dimension 130 of the graph 126 of the ROADM network 104 elements is illustrated and described above with reference to FIG. 2D.

From operation 308, the method 300 proceeds to operation 310. At operation 310, the ROADM controller 120 retrieves the alarm(s) 132 from the ROADM network 104 elements. From operation 310, the method 300 proceeds to operation 312. At operation 312, the ROADM controller 120 associates the alarm(s) 132 with the ROADM network 104 elements in the graph 126. From operation 312, the method 300 proceeds to operation 314. At operation 314, the ROADM controller 120 associates a direction of each alarm 132 with a corresponding service direction.

From operation 314, the method 300 proceeds to operation 316. At operation 316, the ROADM controller 120 eliminates any alarms(s) 132 with a time stamp outside the same time window. For example, two network resources A and B (e.g., ROADMs 108 and/or XPDRs 110) can be topologically related such that a fault at A will always cause a fault at B, but B also could fail without a fault at A. Thus, if two network events within the same time window t (e.g., in tens of seconds to minutes) report resource A and resource B failures, it can be assumed that the fault at B is correlated to the fault at A. However, if the time stamp Δ between these two events exceeds the time window, then the correlation is not applicable and the two failures are considered independent events. In this manner, the time window filter provides differentiation between correlated faults and independent faults between two topologically related resources.

From operation 316, the method 300 proceeds to operation 318. At operation 318, the ROADM controller 120 determines that any remaining alarms 132 are associated with a root cause. This determination can be made via execution of the RCS algorithm 134 (described above). By eliminating the alarms 132 in the graph 126 that have an alarm 132 with time stamps that are in the same time window, the remaining alarms 132 are the root cause(s). Also at operation 318, the ROADM controller 120 can output the remaining alarms 132 that are associated with a root cause. For example, the ROADM controller 120 may output the alarms 132 to a network engineering team that can address the root cause.

From operation 318, the method 300 proceeds to operation 320. The method 300 can end at operation 320.

Figure 4:
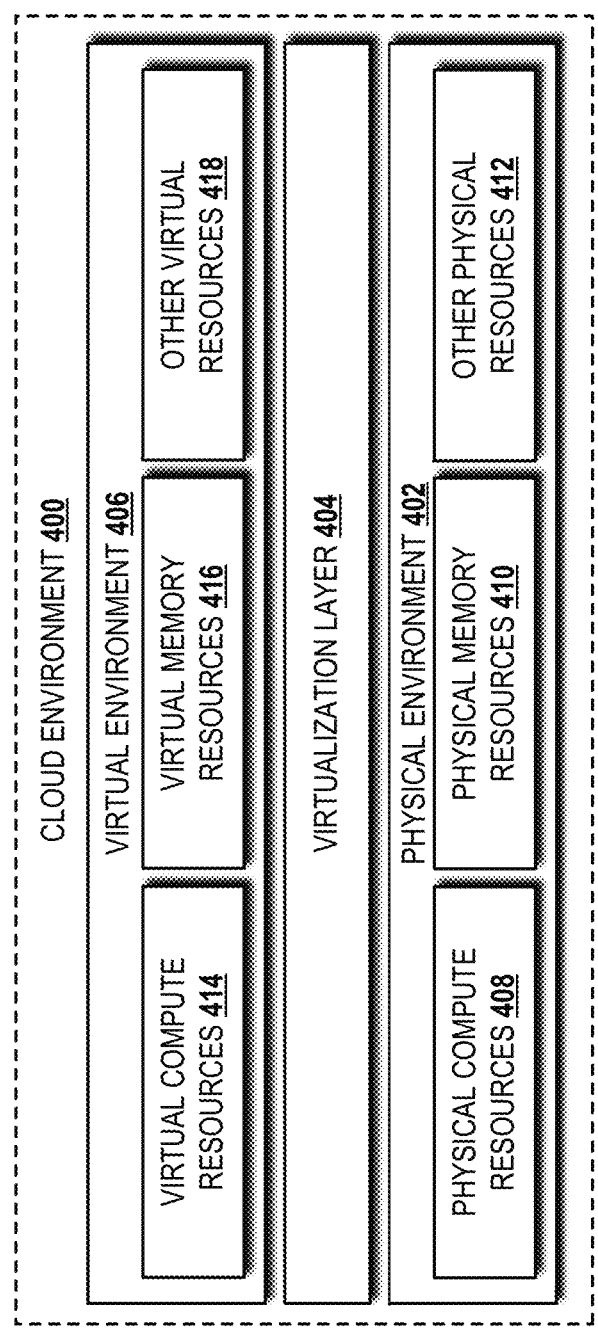
FIG. 4 is a block diagram illustrating aspects of an illustrative cloud environment capable of implementing aspects of the embodiments presented herein.

Turning now to FIG. 4, an illustrative cloud environment 400 will be described, according to an illustrative embodiment. The illustrated cloud environment 400 includes a physical environment 402, a virtualization layer 404, and a virtual environment 406. While no connections are shown in FIG. 4, it should be understood that some, none, or all of the components illustrated in FIG. 4 can be configured to interact with one other to carry out various functions described herein. In some embodiments, the components are arranged so as to communicate via one or more networks. Thus, it should be understood that FIG. 4 and the remaining description are intended to provide a general understanding of a suitable environment in which various aspects of the embodiments described herein can be implemented, and should not be construed as being limiting in any way.

The physical environment 402 provides hardware resources, which, in the illustrated embodiment, include one or more physical compute resources 408, one or more physical memory resources 410, and one or more other physical resources 412. The physical compute resource(s) 408 can include one or more hardware components that perform computations to process data and/or to execute computer-executable instructions of one or more application programs, one or more operating systems, and/or other software. In some embodiments, one or more components of the packet network 102, one or more components of the ROADM network 104, the ROADM controller 120, and/or other elements disclosed herein can be implemented at least in part, by the physical compute resources 408.

The physical compute resources 408 can include one or more central processing units ("CPUs") configured with one or more processing cores. The physical compute resources 408 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 408 can include one or more discrete GPUs. In some other embodiments, the physical compute resources 408 can include CPU and GPU components that are configured in accordance with a co-processing CPU/GPU computing model, wherein the sequential part of an application executes on the CPU and the computationally-intensive part is accelerated by the GPU processing capabilities. The physical compute resources 408 can include one or more system-on-chip ("SoC") components along with one or more other components, including, for example, one or more of the physical memory resources 410, and/or one or more of the other physical resources 412. In some embodiments, the physical compute resources 408 can be or can include one or more SNAPDRAGON SoCs, available from QUALCOMM of San Diego, California; one or more TEGRA SoCs, available from NVIDIA of Santa Clara, California; one or more HUMMINGBIRD SoCs, available from SAMSUNG of Seoul, South Korea; one or more Open Multimedia Application Platform ("OMAP") SoCs, available from TEXAS INSTRUMENTS of Dallas, Texas; one or more customized versions of any of the above SoCs; and/or one or more proprietary SoCs. The physical compute resources 408 can be or can include one or more hardware components architected in accordance with an ARM architecture, available for license from ARM HOLDINGS of Cambridge, United Kingdom. Alternatively, the physical compute resources 408 can be or can include one or more hardware components architected in accordance with an x86 architecture, such an architecture available from INTEL CORPORATION of Mountain View, California, and others. Those skilled in the art will appreciate the implementation of the physical compute resources 408 can utilize various computation architectures, and as such, the physical compute resources 408 should not be construed as being limited to any particular computation architecture or combination of computation architectures, including those explicitly disclosed herein.

The physical memory resource(s) 410 can include one or more hardware components that perform storage/memory operations, including temporary or permanent storage operations. In some embodiments, the physical memory resource(s) 410 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 408.

The other physical resource(s) 412 can include any other hardware resources that can be utilized by the physical compute resources(s) 408 and/or the physical memory resource(s) 410 to perform operations described herein. The other physical resource(s) 412 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 402 can be virtualized by one or more virtual machine monitors (not shown; also known as "hypervisors") operating within the virtualization/control layer 404 to create virtual resources that reside in the virtual environment 406. The virtual machine monitors can be or can include software, firmware, and/or hardware that alone or in combination with other software, firmware, and/or hardware, creates and manages virtual resources operating within the virtual environment 406.

The virtual resources operating within the virtual environment 406 can include abstractions of at least a portion of the physical compute resources 408, the physical memory resources 410, and/or the other physical resources 412, or any combination thereof. In some embodiments, the abstractions can include one or more virtual machines upon which one or more applications can be executed. In some embodiments, one or more components of the packet network 102, one or more components of the ROADM network 104, the ROADM controller 120, and/or other elements disclosed herein can be implemented in the virtual environment 406.

Figure 5:
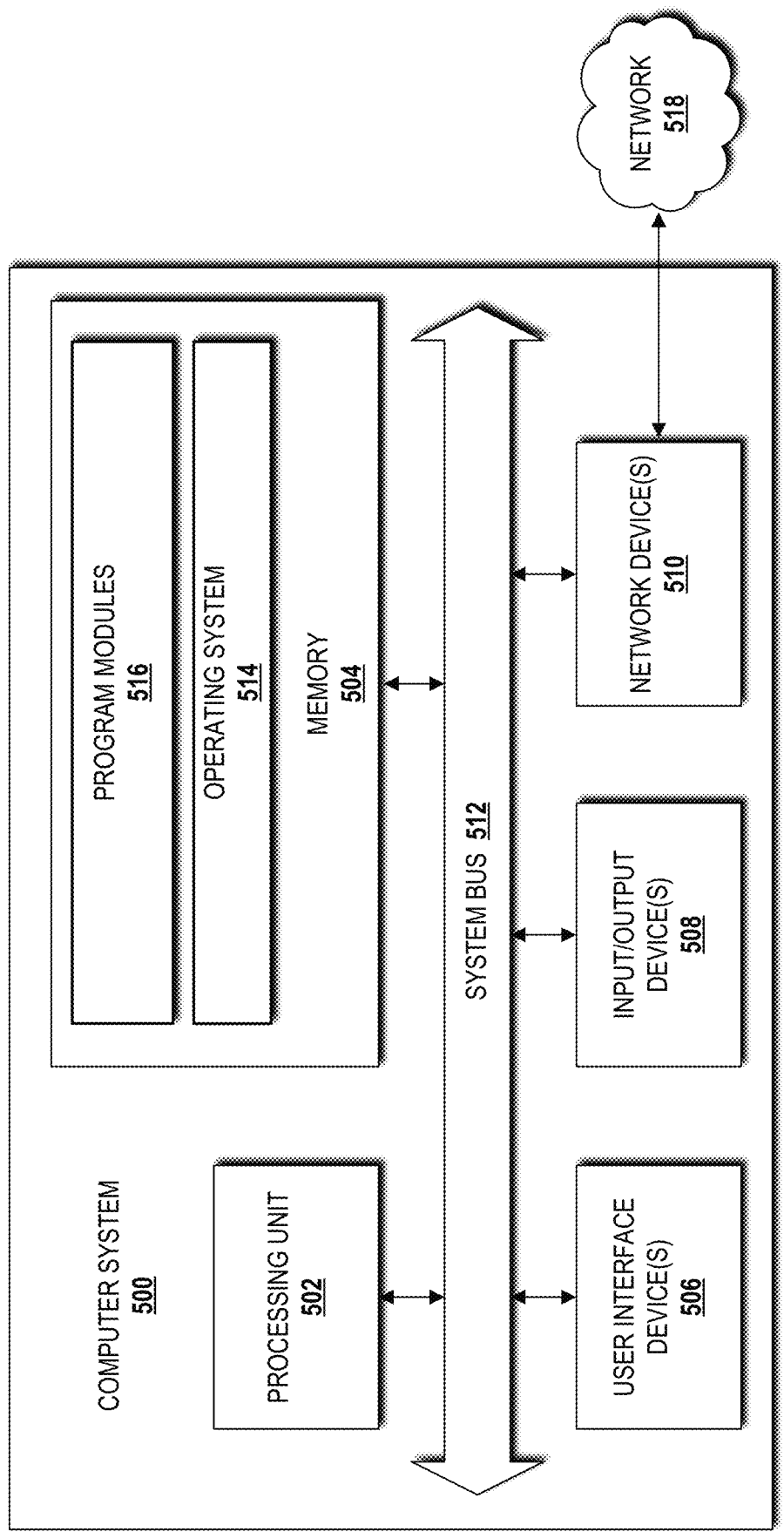
FIG. 5 is a block diagram illustrating an example computer system capable of implementing aspects of the embodiments presented herein.

FIG. 5 is a block diagram illustrating a computer system 500 configured to provide the functionality in accordance with various embodiments of the concepts and technologies disclosed herein. In some embodiments, one or more components of the packet network 102, one or more components of the ROADM network 104, the ROADM controller 120, and/or other elements disclosed herein can be configured, at least in part, like the architecture of the computer system 500. In some implementations, the physical environment 402 (illustrated in FIG. 4) includes one or more computers that are configured like the architecture of the computer system 500. The computer system 500 may provide at least a portion of the physical compute resources 408, the physical memory resources 410, and/or the other physical resources 412. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The physical compute resources 408 (illustrated in FIG. 4) can include one or more processing units 502.

The memory 504 communicates with the processing unit 502 via the system bus 512. In some embodiments, the memory 504 is operatively connected to a memory controller (not shown) that enables communication with the processing unit 502 via the system bus 512. The physical memory resources 410 (illustrated in FIG. 4) can include one or more instances of the memory 504. The illustrated memory 504 contains an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein. The program modules 516 and/or other programs can be embodied in computer-readable media containing instructions that, when executed by the processing unit 502, perform various operations such as those described herein. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, PDAs, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer. In some embodiments, the I/O devices 508 can be used for manual controls for operations to exercise under certain emergency situations.

The network devices 510 enable the computer system 500 to communicate with other networks or remote systems via a network 518, such as the packet network 102. Examples of the network devices 510 include, but are not limited to, a modem, a radio frequency ("RF") or infrared ("IR") transceiver, a telephonic interface, a bridge, a router, or a network card. The network 518 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 518 may be a wired network such as, but not limited to, a Wide Area Network ("WAN"), a wired Personal Area Network ("PAN"), or a wired Metropolitan Area Network ("MAN"). The network 518 may be any other network described herein.

Figure 6:
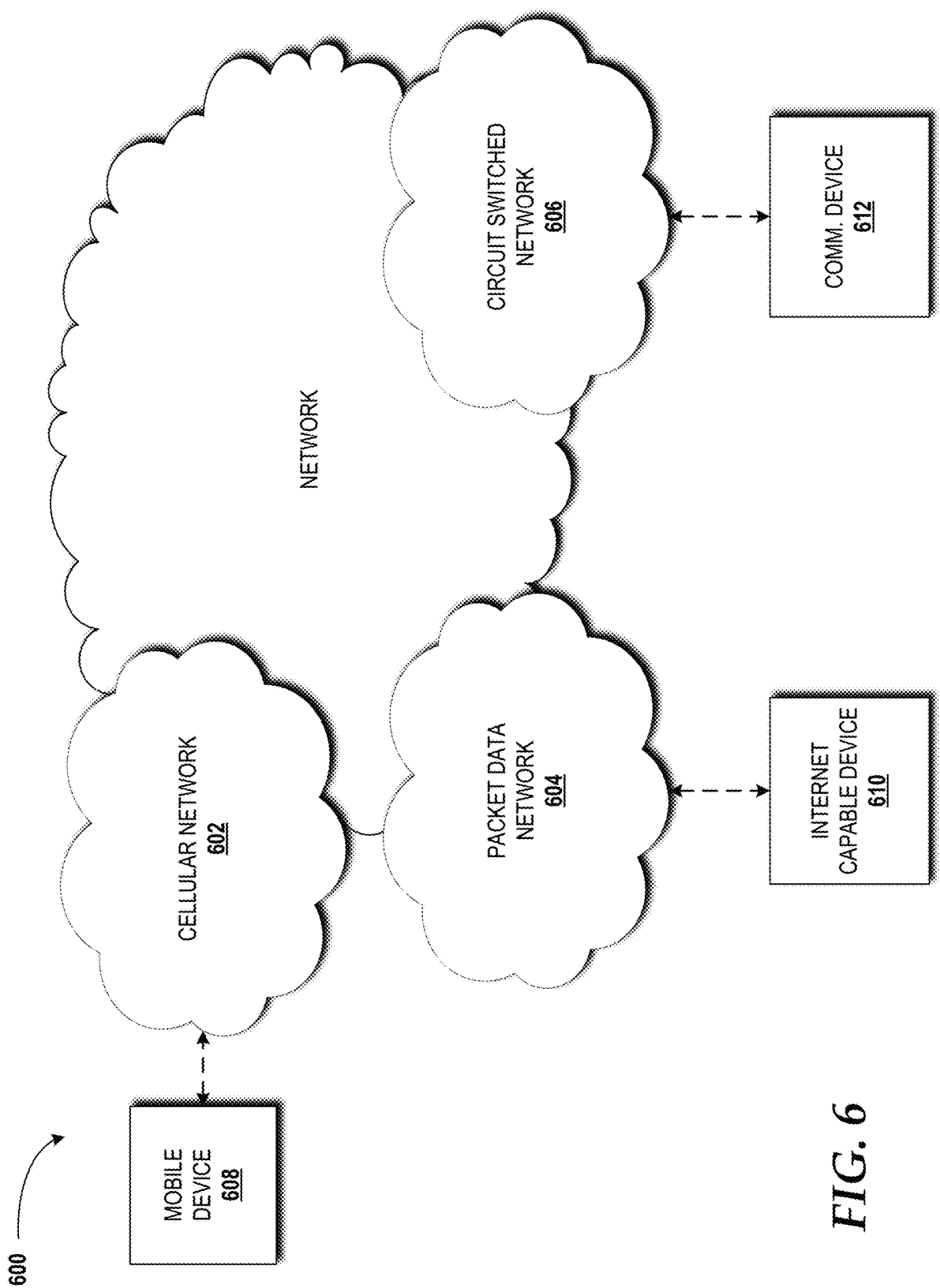
FIG. 6 is a diagram illustrating a network, according to an illustrative embodiment.

Turning now to FIG. 6, details of a network 600 are illustrated, according to an illustrative embodiment. The network 600 includes a cellular network 602, a packet data network 604, and a circuit switched network 606, for example, a public-switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, video data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a Global System for Mobile communications ("GSM") network and can provide data communications via General Packet Radio Service ("GPRS") and/or Enhanced Data rates for GSM Evolution ("EDGE"). Additionally, or alternatively, the cellular network 602 can be configured as a 3G Universal Mobile Telecommunications Service ("UMTS") network and can provide data communications via the High-Speed Packet Access ("HSPA") protocol family, for example, High-Speed Downlink Packet Access ("HSDPA"), High-Speed Uplink Packet Access ("HSUPA") (also known as Enhanced Uplink ("EUL")), and HSPA+. The cellular network 602 also is compatible with 4G mobile communications standards such as Long-Term Evolution ("LTE"), or the like, as well as evolved and future mobile standards.

The packet data network 604 includes various devices, for example, servers, computers, databases, routers, packet gateways, and other devices in communication with one another, as is generally known. The packet data network 604 can be or can include the packet network 102. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough the packet data network 604 and/or the cellular network 602. It should be appreciated that the communications device 612 can be an Internet-capable device, and can be substantially similar to the Internet-capable device 610. In the specification, the network is used to refer broadly to any combination of the networks 602, 604, 606.

Figure 7:
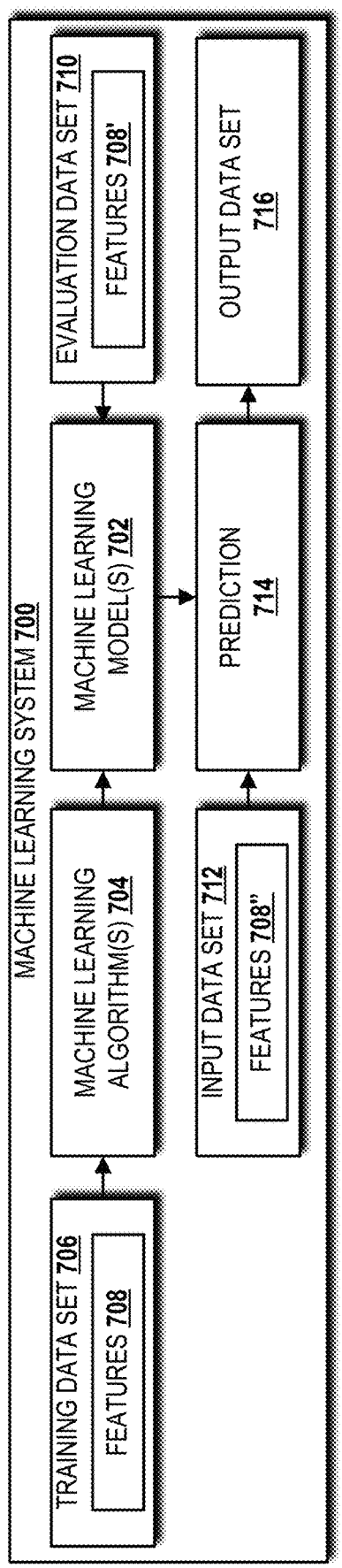
FIG. 7 is a block diagram illustrating a machine learning system capable of implementing aspects of the concept and technologies disclosed herein.

Turning now to FIG. 7, a machine learning system 700 capable of implementing aspects of the embodiments disclosed herein will be described. In some embodiments, aspects of the alarm correlation and ticketing function 124 can be enhanced through the use of machine learning and/or artificial intelligence applications. Accordingly, the ROADM controller 120 can include the machine learning system 700 or can be in communication with the machine learning system 700. The machine learning system 700 can, for example, be used to implement the RCS algorithm 134.

The illustrated machine learning system 700 includes one or more machine learning models 702. The machine learning models 702 can include supervised and/or semi-supervised learning models. The machine learning model(s) 702 can be created by the machine learning system 700 based upon one or more machine learning algorithms 704. The machine learning algorithm(s) 704 can be any existing, well-known algorithm, any proprietary algorithms, or any future machine learning algorithm. Some example machine learning algorithms 704 include, but are not limited to, neural networks, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 704 based upon the problem(s) to be solved by machine learning via the machine learning system 700.

The machine learning system 700 can control the creation of the machine learning models 702 via one or more training parameters. In some embodiments, the training parameters are selected modelers at the direction of an enterprise, for example. Alternatively, in some embodiments, the training parameters are automatically selected based upon data provided in one or more training data sets 706. The training parameters can include, for example, a learning rate, a model size, a number of training passes, data shuffling, regularization, and/or other training parameters known to those skilled in the art. The training data in the training data sets 706.

The learning rate is a training parameter defined by a constant value. The learning rate affects the speed at which the machine learning algorithm 704 converges to the optimal weights. The machine learning algorithm 704 can update the weights for every data example included in the training data set 706. The size of an update is controlled by the learning rate. A learning rate that is too high might prevent the machine learning algorithm 704 from converging to the optimal weights. A learning rate that is too low might result in the machine learning algorithm 704 requiring multiple training passes to converge to the optimal weights.

The model size is regulated by the number of input features ("features") 708 in the training data set 706. A greater the number of features 708 yields a greater number of possible patterns that can be determined from the training data set 706. The model size should be selected to balance the resources (e.g., compute, memory, storage, etc.) needed for training and the predictive power of the resultant machine learning model 702.

The number of training passes indicates the number of training passes that the machine learning algorithm 704 makes over the training data set 706 during the training process. The number of training passes can be adjusted based, for example, on the size of the training data set 706, with larger training data sets being exposed to fewer training passes in consideration of time and/or resource utilization. The effectiveness of the resultant machine learning model 702 can be increased by multiple training passes.

Data shuffling is a training parameter designed to prevent the machine learning algorithm 704 from reaching false optimal weights due to the order in which data contained in the training data set 706 is processed. For example, data provided in rows and columns might be analyzed first row, second row, third row, etc., and thus an optimal weight might be obtained well before a full range of data has been considered. By data shuffling, the data contained in the training data set 706 can be analyzed more thoroughly and mitigate bias in the resultant machine learning model 702.

Regularization is a training parameter that helps to prevent the machine learning model 702 from memorizing training data from the training data set 706. In other words, the machine learning model 702 fits the training data set 706, but the predictive performance of the machine learning model 702 is not acceptable. Regularization helps the machine learning system 700 avoid this overfitting/memorization problem by adjusting extreme weight values of the features 708. For example, a feature that has a small weight value relative to the weight values of the other features in the training data set 706 can be adjusted to zero.

The machine learning system 700 can determine model accuracy after training by using one or more evaluation data sets 710 containing the same features 708' as the features 708 in the training data set 706. This also prevents the machine learning model 702 from simply memorizing the data contained in the training data set 706. The number of evaluation passes made by the machine learning system 700 can be regulated by a target model accuracy that, when reached, ends the evaluation process and the machine learning model 702 is considered ready for deployment.

After deployment, the machine learning model 702 can perform a prediction operation ("prediction") 714 with an input data set 712 having the same features 708" as the features 708 in the training data set 706 and the features 708' of the evaluation data set 710. The results of the prediction 714 are included in an output data set 716 consisting of predicted data. The machine learning model 702 can perform other operations, such as regression, classification, and others. As such, the example illustrated in FIG. 7 should not be construed as being limiting in any way.

Based on the foregoing, it should be appreciated that concepts and technologies directed to alarm correlation and ticketing for ROADM networks have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:

creating, by a reconfigurable optical add/drop multiplexer ("ROADM") controller comprising a processor, based upon data associated with a plurality of ROADM network elements operating in a ROADM network, a graph of the plurality of ROADM network elements, wherein creating the graph of the plurality of ROADM network elements comprises creating, by the ROADM controller, based upon the data associated with the plurality of ROADM network elements operating in the ROADM network, a hierarchical dimension of the graph, wherein the hierarchical dimension of the graph represents hierarchical relationships between containing entities and contained entities among the plurality of ROADM network elements;

retrieving, by the ROADM controller, a plurality of alarms from at least a portion the plurality of ROADM network elements;

associating, by the ROADM controller, the plurality of alarms with at least the portion of the plurality of ROADM network elements;

associating, by the ROADM controller, a direction of each alarm of the plurality of alarms with a corresponding service direction;

eliminating, by the ROADM controller, any alarms of the plurality of alarms with a time stamp outside of a same time window; and determining, by the ROADM controller, that any remaining alarms of the plurality of alarms are associated with a root cause of a failure within the ROADM network.

2. The method of claim 1, further comprising:
monitoring, by the ROADM controller, the plurality of ROADM network elements operating in the ROADM network; and
acquiring, by the ROADM controller, the data from the plurality of ROADM network elements.

3. The method of claim 2, wherein monitoring, by the ROADM controller, the plurality of ROADM network elements comprises monitoring, by the ROADM controller, the plurality of ROADM network elements via an application programming interface.

4. The method of claim 1, wherein creating, by the ROADM controller, based upon the data associated with the plurality of ROADM network elements operating in the ROADM network, the graph of the plurality of ROADM network elements further comprises creating, by the ROADM controller, based upon the data associated with the plurality of ROADM network elements operating in the ROADM network, a horizontal dimension of the graph, wherein the horizontal dimension of the graph represents supporting relationships between a supported logical circuit, path, or link and an ordered list of supporting ports, interfaces, logical connections, and links.

5. The method of claim 4, wherein the plurality of ROADM network elements comprise a plurality of ROADMs and a plurality of xponders.

6. The method of claim 5, wherein the ROADM controller and the plurality of ROADM network elements are configured in accordance with Open ROADM multi-source agreement.

7. A reconfigurable optical add/drop multiplexer ("ROADM") controller comprising:
a processor; and
a memory comprising instructions that, when executed by the processor, cause the processor to perform operations comprising
creating, based upon data associated with a plurality of ROADM network elements operating in a ROADM network, a graph of the plurality of ROADM network elements, wherein creating the graph of the plurality of ROADM network elements comprises creating, based upon the data associated with the plurality of ROADM network elements operating in the ROADM network, a hierarchical dimension of the graph, wherein the hierarchical dimension of the graph represents hierarchical relationships between containing entities and contained entities among the plurality of ROADM network elements,
retrieving a plurality of alarms from at least a portion the plurality of ROADM network elements,
associating the plurality of alarms with at least the portion of the plurality of ROADM network elements,
associating a direction of each alarm of the plurality of alarms with a corresponding service direction,
eliminating any alarms of the plurality of alarms with a time stamp outside of a same time window, and
determining that any remaining alarms of the plurality of alarms are associated with a root cause of a failure within the ROADM network.

8. The ROADM controller of claim 7, wherein the operations further comprise:
monitoring the plurality of ROADM network elements operating in the ROADM network; and
acquiring the data from the plurality of ROADM network elements.

9. The ROADM controller of claim 8, wherein monitoring the plurality of ROADM network elements comprises monitoring the plurality of ROADM network elements via an application programming interface.

10. The ROADM controller of claim 7, wherein creating, based upon the data associated with the plurality of ROADM network elements operating in the ROADM network, the graph of the plurality of ROADM network elements further comprises creating, based upon the data associated with the plurality of ROADM network elements operating in the ROADM network, a horizontal dimension of the graph, wherein the horizontal dimension of the graph represents supporting relationships between a supported logical circuit, path, or link and an ordered list of supporting ports, interfaces, logical connections, and links.

11. The ROADM controller of claim 10, wherein the plurality of ROADM network elements comprise a plurality of ROADMs and a plurality of xponders.

12. The ROADM controller of claim 11, wherein the ROADM controller and the plurality of ROADM network elements are configured in accordance with Open ROADM multi-source agreement.

13. A computer-readable storage medium comprising computer-executable instructions that, when executed by a processor, cause the processor to perform operations comprising:
creating, based upon data associated with a plurality of ROADM network elements operating in a ROADM network, a graph of the plurality of ROADM network elements, wherein creating the graph of the plurality of ROADM network elements comprises creating, based upon the data associated with the plurality of ROADM network elements operating in the ROADM network, a hierarchical dimension of the graph, wherein the hierarchical dimension of the graph represents hierarchical relationships between containing entities and contained entities among the plurality of ROADM network elements;
retrieving, by the ROADM controller, a plurality of alarms from at least a portion the plurality of ROADM network elements;
associating, by the ROADM controller, the plurality of alarms with at least the portion of the plurality of ROADM network elements;
associating a direction of each alarm of the plurality of alarms with a corresponding service direction;
eliminating any alarms of the plurality of alarms with a time stamp outside of same time window; and
determining that any remaining alarms of the plurality of alarms are associated with a root cause of a failure within the ROADM network.

14. The computer-readable storage medium of claim 13, wherein the operations further comprise:
monitoring the plurality of ROADM network elements operating in the ROADM network; and
acquiring the data from the plurality of ROADM network elements.

15. The computer-readable storage medium of claim 14, wherein monitoring the plurality of ROADM network elements comprises monitoring the plurality of ROADM network elements via an application programming interface.

16. The computer-readable storage medium of claim 13, wherein creating, based upon the data associated with the plurality of ROADM network elements operating in the ROADM network, the graph of the plurality of ROADM network elements further comprises creating, based upon the data associated with the plurality of ROADM network elements operating in the ROADM network, a horizontal dimension of the graph, wherein the horizontal dimension of the graph represents supporting relationships between a supported logical circuit, path, or link and an ordered list of supporting ports, interfaces, logical connections, and links.

17. The computer-readable storage medium of claim 16, wherein the plurality of ROADM network elements comprise a plurality of ROADMs and a plurality of xponders.

* * * * *